United States Patent
Chenguttuvan et al.

(10) Patent No.: US 11,327,873 B2
(45) Date of Patent: May 10, 2022

(54) SYSTEM AND METHOD FOR IDENTIFICATION OF APPROPRIATE TEST CASES USING ARTIFICIAL INTELLIGENCE FOR SOFTWARE TESTING

(71) Applicant: WIPRO LIMITED, Bangalore (IN)

(72) Inventors: Gopinath Chenguttuvan, Chennai (IN); Balamurugan Kannan, Chennai (IN)

(73) Assignee: Wipro Limited, Bangalore (IN)

( * ) Notice: Subject to any disclaimer, the term of this patent is extended or adjusted under 35 U.S.C. 154(b) by 152 days.

(21) Appl. No.: 16/835,147

(22) Filed: Mar. 30, 2020

(65) Prior Publication Data

US 2021/0303442 A1    Sep. 30, 2021

(30) Foreign Application Priority Data

Mar. 27, 2020  (IN) .............................. 202041013487

(51) Int. Cl.
*G06F 11/36*  (2006.01)
*G06N 3/08*  (2006.01)

(52) U.S. Cl.
CPC ........ *G06F 11/368* (2013.01); *G06F 11/3684* (2013.01); *G06F 11/3688* (2013.01); *G06N 3/08* (2013.01)

(58) Field of Classification Search
CPC ............ G06F 11/3684; G06F 11/3688; G06F 11/368; G06N 3/08
See application file for complete search history.

(56) References Cited

U.S. PATENT DOCUMENTS

| 10,423,519 B2 | 9/2019 | Andrejko et al. |
| 10,678,678 B1 * | 6/2020 | Tsoukalas ........... G06F 11/3664 |
| 2013/0086556 A1 * | 4/2013 | Grechanik .......... G06F 11/3676 717/126 |

(Continued)

FOREIGN PATENT DOCUMENTS

CN    110321291 A    10/2019

OTHER PUBLICATIONS

Simpson, J., et al., "Automated Software Testing Implementation Guide", STAT T&E Center of Excellence 2017, pp. 1-37.

(Continued)

*Primary Examiner* — Wei Y Zhen
*Assistant Examiner* — Amir Soltanzadeh
(74) *Attorney, Agent, or Firm* — Finnegan, Henderson, Farabow, Garrett & Dunner, LLP (57) ABSTRACT

A method and a system of selecting test cases from existing test cases for a new software testing requirement are disclosed. In an embodiment, the method may include determining a confidence score associated with each of existing test cases, based on comparing a new software testing requirement with the existing test cases using a Recurrent Neural Network (RNN) model, and selecting a set of test cases from the existing test cases based on the confidence score and a predetermined threshold confidence score. The method may further include predicting a defect slippage rate associated with each test case using a linear regression model, and shortlisting a sub-set of test cases from the set of test cases based on the predicted defect slippage rate associated with each test case and a predetermined threshold defect slippage rate.

17 Claims, 8 Drawing Sheets

(56) References Cited

U.S. PATENT DOCUMENTS

| | | | |
|---|---|---|---|
| 2018/0129597 A1* | 5/2018 | Anaya | G06F 11/3692 |
| 2019/0294536 A1* | 9/2019 | Avisror | G06F 11/3688 |
| 2019/0385480 A1* | 12/2019 | Suzuki | G10L 25/30 |
| 2020/0310948 A1* | 10/2020 | Culibrk | G06F 17/18 |
| 2021/0263841 A1* | 8/2021 | Mo | G06F 11/3604 |

OTHER PUBLICATIONS

Tahat, L., et al., "Requirement based Automated Black-Box Test Generation", IEEE 2001, pp. 489-495.
Mats, L., et al., "The top five software-testing problems and how to avoid them", EDN, 2001, 8 pages.

* cited by examiner

SYSTEM AND METHOD FOR IDENTIFICATION OF APPROPRIATE TEST CASES USING ARTIFICIAL INTELLIGENCE FOR SOFTWARE TESTING

TECHNICAL FIELD

This disclosure relates generally to software testing, and more particularly to method and system of selecting test cases from existing test cases for a new software testing requirement.

BACKGROUND

Software testing plays an important role in investigating about quality of a software product or a service under test, and in making various stakeholders aware about risks of software implementation. For example, the software testing may include executing a program or an application with an intent to find errors and defects, and to verify that the software product is fit for use. To this end, a pool of large number of test cases (and test scripts) is available which may be used for testing a new requirement. However, selecting relevant tests cases out of the pool is a challenge.

Some existing techniques are available which provide for mapping existing test cases and test scripts with the new requirements. However, these techniques require manual intervention, which introduces delay and inaccuracy in software testing. Further, this affects the software product development cycle.

Therefore, an automated testing technique is desired which is capable of selecting test cases from existing test cases for a new software testing requirement accurately and efficiently.

SUMMARY

In one embodiment, a method of selecting test cases from existing test cases for a new software testing requirement is disclosed. The method may include determining a confidence score associated with each of existing test cases, based on comparing a new software testing requirement with the existing test cases using a Recurrent Neural Network (RNN) model. The confidence score may be representative of an extent of relevance of an associated test case from the existing test cases with the new software testing requirement. The method may further include selecting a set of test cases from the existing test cases based on the confidence score associated with each test case of the existing test cases and a predetermined threshold confidence score. The method may further include predicting a defect slippage rate associated with each test case from the set of test cases using a linear regression model. The defect slippage rate may be representative of a likelihood of occurrence of defects during execution of the associated test case. The method may further include shortlisting, for the new software testing requirement, a sub-set of test cases from the set of test cases based on the predicted defect slippage rate associated with each test case from the set of test cases and a predetermined threshold defect slippage rate.

In another embodiment, a test case selecting device for selecting test cases from existing test cases for a new software testing requirement is disclosed. The test case selecting device includes a processor and a memory communicatively coupled to the processor. The memory stores processor instructions, which, on execution, may cause the processor to determine a confidence score associated with each of existing test cases, based on comparing a new software testing requirement with the existing test cases using an RNN model. The confidence score may be representative of an extent of relevance of an associated test case from the existing test cases with the new software testing requirement. The processor instructions, on execution, may further cause the processor to select a set of test cases from the existing test cases based on the confidence score associated with each test case of the existing test cases and a predetermined threshold confidence score. The processor instructions, on execution, may further cause the processor to predict a defect slippage rate associated with each test case from the set of test cases using a linear regression model. The defect slippage rate may be representative of a likelihood of occurrence of defects during execution of the associated test case. The processor instructions, on execution, may further cause the processor to shortlist a sub-set of test cases from the set of test cases based on the predicted defect slippage rate associated with each test case from the set of test cases and a predetermined threshold defect slippage rate.

In yet another embodiment, a non-transitory computer-readable storage medium is disclosed. The non-transitory computer-readable storage medium has stored thereon, a set of computer-executable instructions causing a computer comprising one or more processors to perform steps including determining a confidence score associated with each of existing test cases, based on comparing a new software testing requirement with the existing test cases using a RNN model. The confidence score may be representative of an extent of relevance of an associated test case from the existing test cases with the new software testing requirement. The steps may further include selecting a set of test cases from the existing test cases based on the confidence score associated with each test case of the existing test cases and a predetermined threshold confidence score, and predicting a defect slippage rate associated with each test case from the set of test cases using a linear regression model. The defect slippage rate may be representative of a likelihood of occurrence of defects during execution of the associated test case. The steps may further include shortlisting, for the new software testing requirement, a sub-set of test cases from the set of test cases based on the predicted defect slippage rate associated with each test case from the set of test cases and a predetermined threshold defect slippage rate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
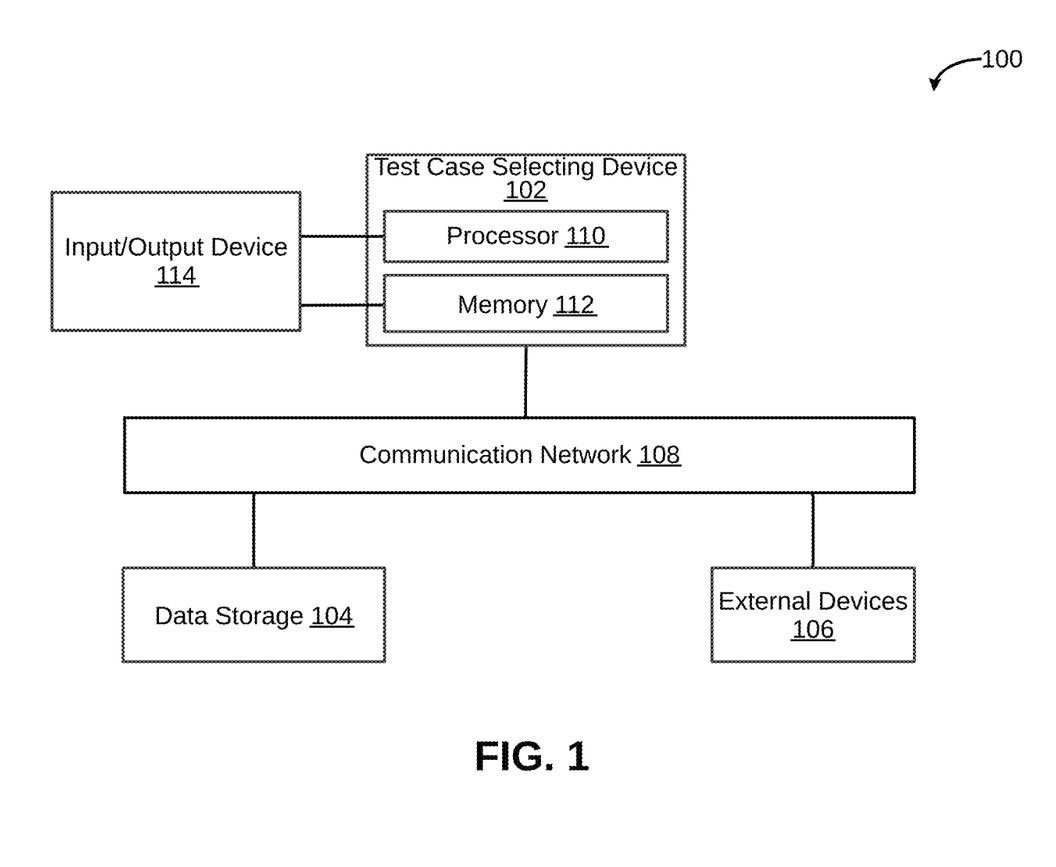
FIG. 1 is a block diagram of a system for selecting test cases from existing test cases for a new software testing requirement, in accordance with an embodiment.

In one embodiment, a block diagram of a system 100 for selecting test cases from existing test cases for a new software testing requirement is illustrated in FIG. 1, in accordance with an embodiment. The system 100 may include a test case selecting device 102. The test case selecting device 102 may be a computing device having data processing capability. In particular, the test case selecting device 102 may have capability for selecting test cases from existing test cases for a new software testing requirement. Examples of the test case selecting device 102 may include, but are not limited to a server, a desktop, a laptop, a notebook, a netbook, a tablet, a smartphone, a mobile phone, an application server, a sever, or the like. The system 100 may further include a data storage 104. For example, the data storage 104 may store existing test cases. The test case selecting device 102 may be communicatively coupled to the data storage 104 via a communication network 108. The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

As will be described in greater detail in conjunction with FIG. 2 to FIG. 6, in order to select test cases from existing test cases for a new software testing requirement, the test case selecting device 102 may determine a confidence score associated with each of existing test cases, based on comparing a new software testing requirement with the existing test cases using a Recurrent Neural Network (RNN) model. It may be noted that the confidence score may be representative of an extent of relevance of an associated test case from the existing test cases with the new software testing requirement. The test case selecting device 102 may further select a set of test cases from the existing test cases based on the confidence score associated with each test case of the existing test cases and a predetermined threshold confidence score. The test case selecting device 102 may further predict a defect slippage rate associated with each test case from the set of test cases using a linear regression model. The defect slippage rate may be representative of a likelihood of occurrence of defects during execution of the associated test case. The test case selecting device 102 may further shortlist, for the new software testing requirement, a sub-set of test cases from the set of test cases based on the predicted defect slippage rate associated with each test case from the set of test cases and a predetermined threshold defect slippage rate.

In order to perform the above-discussed functionalities, the test case selecting device 102 may include a processor 110 and a memory 112. The memory 112 may store instructions that, when executed by the processor 110, cause the processor 110 to select test cases from existing test cases for the new software testing requirement, as discussed in greater detail in FIG. 2 to FIG. 6. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g. confidence score data, comparison data, RNN data, relevance data, defect slippage rate data, linear regression model data, output data, status data, defects data, etc.) that may be captured, processed, and/or required by the system 100.

The test case selecting device 102 may further include one or more input/output devices 114 through which the test case selecting device 102 may interact with a user and vice versa. By way of an example, the input/output device 114 may be used to display a status assigned to test case from a sub-set of test cases, as will be discussed later. The system 100 may interact with one or more external devices 106 over the communication network 108 for sending or receiving various data. Examples of the one or more external devices 106 may include, but are not limited to a remote server, a digital device, or another computing system.

Figure 2:
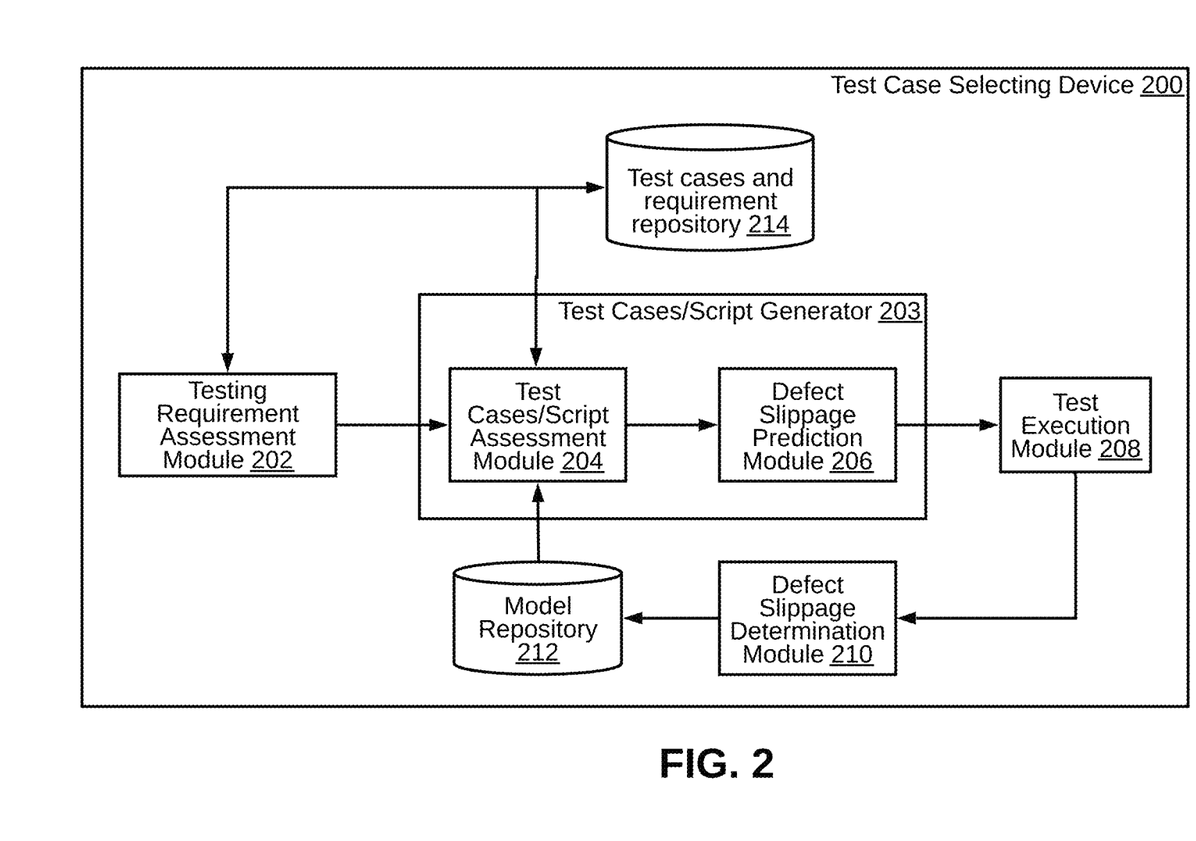
FIG. 2 is a functional block diagram of a test case selecting device for selecting test cases from existing test cases for a new software testing requirement, in accordance with an embodiment.

Referring now to FIG. 2, a functional block diagram of a test case selecting device 200 (analogous to test case selecting device 102) for selecting test cases from existing test cases for a new software testing requirement is illustrated, in accordance with an embodiment of the present disclosure. In some embodiments, the test case selecting device 200 may include a testing requirement assessment module 202, a test cases/script assessment module 204, a defect slippage prediction module 206, a test execution module 208, and a defect slippage determination module 210. Further, the test case selecting device 200 may include a model repository 212 and a test cases and requirement repository 214.

The testing requirement assessment module 202 may receive product testing requirements as an input. It may be noted that the product testing requirements may be generated manually or through a voice-based prompt, for example, by a product testing team. The testing requirement assessment module 202 may correlate the received testing requirement for testing the product with existing (available) test requirements. These existing test requirements may have been stored in the test cases and requirement repository 214.

The testing requirement assessment module 202 may first attempt to identify testing requirements from the existing (available) test requirements which are similar to the received testing requirement. To this end, in some embodiments, a Jaccard Index and a Jaccard similarity coefficient may be used. As it will be appreciated by those skilled in the art, the Jaccard Index is an intersection over union of sets. The Jaccard Index and the Jaccard similarity coefficient may be used for gauging similarity and diversity between two sets. The Jaccard coefficient measures similarity between finite sample sets, and is defined as the size of the intersection divided by the size of the union of the sample sets.

In some scenarios, the Jaccard index may be determined to be 0, i.e. no test requirements similar to the received testing requirements may be identified from the existing test requirements. In such scenarios, the testing requirement assessment module 202 may consider the received testing requirements as new testing requirement scenario (odd man out).

Upon identifying a product testing requirement as the new testing requirement, the testing requirement assessment module 202 may check a feasibility of the new testing requirement. The feasibility may be determined based on identifying whether the product under testing has implemented that testing requirement (functionality) in its development phase. If the new testing requirement is not feasible, the testing requirement assessment module 202 may not proceed for testing the new testing requirement. Further, if the new testing requirement is found to be feasible, the testing requirement assessment module 202 may proceed for testing the new requirement.

In some embodiments, the test case selecting device 200 may include a test cases/script generator 203 which may implement the test cases/script assessment module 204 and the defect slippage prediction module 206. The test cases/script assessment module 204 may receive the feasible testing requirement from the testing requirement assessment module 202. The test cases/script assessment module 204 may further output test cases associated with the new testing requirement along with a confidence level to the defect slippage prediction module 206.

The test cases/script assessment module 204 may compare existing test cases (stored in the test cases and requirement repository 214) with the new testing requirement, based on a RNN model. Based on the comparison, the test cases/script assessment module 204 may identify the confidence level for the existing test cases. One or more RNN model parameters may be used to correlate and identify the confidence level. For example, the RNN module parameters may be retrieved from the model repository 212. The RNN module parameters may be used for identifying suitable test cases with corresponding confidence level.

The test cases/script assessment module 204 may further convert the new testing requirement into a real vector. To this end, words may be encoded as real-valued vectors in a high dimensional space. It may be understood that a similarity between words in terms of meaning may translate to closeness in the vector space. As such, more the closeness, higher may be the confidence level of the test cases associated with the feasible testing requirement. Further, test scripts corresponding to the test cases having confidence level (also called probability level) with respect to the feasible testing requirement greater than a predefined threshold may be retrieved from the test cases and requirement repository 214, and sent to the defect slippage prediction module 206.

The defect slippage prediction module 206 may receive test cases/scripts having confidence level (probability level) greater than the predetermined threshold confidence score, and may predict a defect slippage rate of the identified test cases/scripts. Based on the predicted defect slippage rate, the defect slippage prediction module 206 may provide a set of test cases/scripts to the test execution module 208 for product testing. It may be noted that the defect slippage rate may be predicted using a linear regression model. It may be further noted that the linear regression model may use input features like complexity, lines of code (LOC), and number of dependent modules. Further, more features may be added based on data availability. A logic may be applied such that for every defect slippage rate lower than a defect slippage threshold, the top probabilities from the RNN and the related script may be selected for testing for better coverage. In other words, test cases having confidence score higher than the predetermined threshold confidence score and defect slippage rate lower than the predetermined threshold defect slippage rate may be selected. For example, if the defect slippage rate is 3%, then top 3 probabilities and their corresponding scripts may be selected and executed.

The test execution module 208 may execute the selected set of test scripts received from defect slippage prediction module 206 for the product under testing. Based on the execution, a test execution status may be generated. The test execution status may be either "successful" or "unsuccessful" based on the comparison of output of the test execution with a predetermined output. In some embodiments, the text execution status may be provided/outputted/displayed on the user interface, like a display screen, etc.

The defect slippage determination module 210 may determine the actual defect slippage rate from the production defects (post execution) of the set of suitable test scripts. This actual defect slippage rate may be used as feedback post execution for validating and tuning the model parameters.

The model repository 212 may store the RNN model parameters which may be used for the identification of appropriate test cases for software testing. The model repository 212 may also perform auto-tuning of the model parameter by calculating the defect slippage rate from the production defects (post execution) of the selected set of test scripts. If the actual defect slippage rate is less than or equal to the predicted defect slippage rate (via linear regression), the determined automation scope may be set to be "appropriate". This may eventually lead to a drop in the defect slippage rate. However, if the actual defect slippage rate from production defects (post execution) is greater than the predicted defect slippage rate, automation scope determination may be "not appropriate", and as such, the RNN model parameters may be auto-tuned to reach maximum accuracy. Thereafter, the updated RNN model may be used for script selection. The tuned model parameters may be used for identification of the appropriate test cases for future product testing requirements.

The test cases and requirement repository 214 may store all the test cases and test scripts with associated testing requirements (or, product features). Further, an association of the test cases/scripts with new testing requirements may be stored in the test cases and requirement repository 214 for future product testing. After executing the test scripts for product under test, the test results may be updated in the test cases and requirement repository 214.

Figure 3:
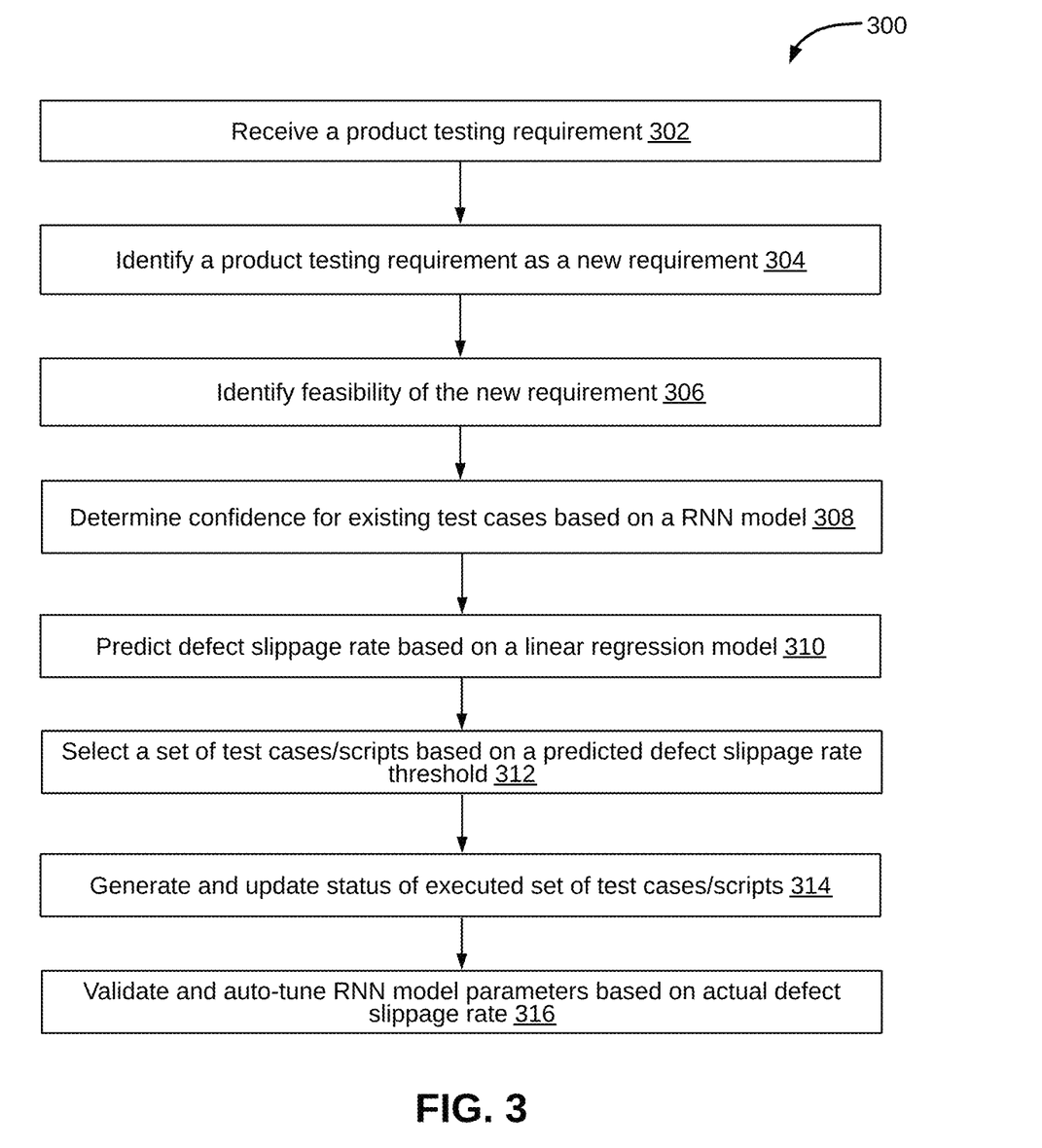
FIG. 3 is a flowchart of a process for selecting test cases from existing test cases for a new software testing requirement, in accordance with an embodiment.

Referring now to FIG. 3, a flowchart of a process 300 for selecting test cases from existing test cases for a new software testing requirement is illustrated, in accordance with an embodiment of the present disclosure. At step 302, a product testing requirement may be received. The product testing requirement may be received as an input which might be generated manually or through a voice-based prompt, for example, by a product testing team. It may be noted that the product testing requirement may describe a requirement (to be tested) of the product under test.

At step 304, the product testing requirement may be identified as a new testing requirement. In one embodiment, the product testing requirement may be identified as the new testing requirement based on a Jaccard Index. The received new testing requirement may be correlated with the available test requirements stored in the test cases and requirement repository 214. It may be noted that the Jaccard Index (also known as intersection over union) and Jaccard similarity coefficient may be used for gauging similarity and diversity between two sets. The Jaccard similarity coefficient may measure similarity between finite sample sets, and may be defined as the size of the intersection divided by the size of the union of the sample sets. In scenarios, when the Jaccard Index is 0, the product testing requirement may be treated as a new requirement (odd man out).

At step 306, a feasibility of the new testing requirement may be identified. Upon identifying the product testing requirement as the new testing requirement (at step 304), the testing requirement assessment module 202 may check the feasibility of the new testing requirement, so as to adequately cover new features. The feasibility may be determined by identifying whether the product under testing has implemented the requirement (functionality) in its development phase. Accordingly, if the new testing requirement is not feasible, the system may not proceed for testing the new requirement. However, if the new testing requirement is feasible, the system may proceed for testing the new requirement.

At step 308, a confidence for existing test cases may be determined based on the RNN model. The existing test cases in the test cases and requirement repository 214 may be compared with the new testing requirement based on the RNN model to identify the confidence level for the existing test cases. Further, one or more RNN model parameters may be used to correlate and identify the confidence level. The RNN model parameters may be retrieved from the model repository 212 for the identification of suitable test cases with corresponding confidence level.

In some embodiments, the new testing requirement may be converted into a real vector. For example, words may be encoded as real-valued vectors in a high dimensional space, where the similarity between words in terms of meaning translates to closeness in the vector space. Further, a skip-gram neural network model may be used. The neural network may be trained with a single hidden layer to perform a certain task with an objective to learn the weights of the hidden layer.

In some embodiments, for a specific word in the middle of a sentence (the input word), the neural network may look at the words nearby and pick one at random. The neural network may generate a probability for every word in the vocabulary of being a "nearby word". The probabilities may indicate how likely it is to find each vocabulary word nearby to the input word. For example, when a word "Trade" is inputted, the output probabilities are going to be higher for related words like "Fund", "Processing", "Cusip" and "Party id", as compared to unrelated words like "reports" and "downstream applications". The input word "Trade" may be inputted as a one-hot vector having 5,000 components (one for every word in the vocabulary). As such, the neural network may place a "1" in the position corresponding to the word "Trade", and "0"s in all the other positions. The output of the neural network may be a single vector (also with 5,000 components) containing, for every word in the vocabulary, a probability that a randomly selected nearby word is that vocabulary word. The neural network is further described in detail in conjunction with FIG. 4 and FIG. 5.

Figure 4:
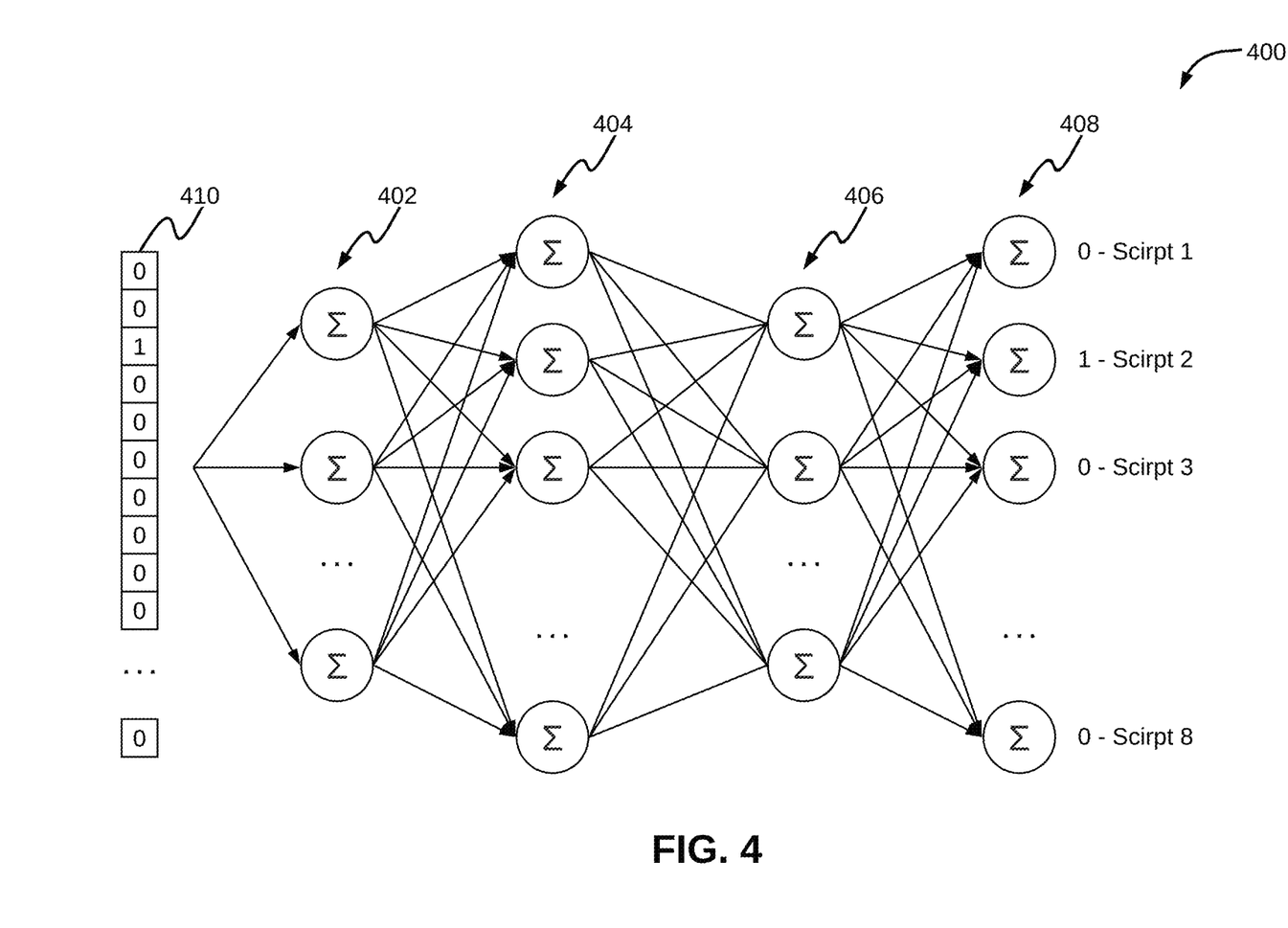
FIG. 4 is a block diagram of a neural network, in accordance with an embodiment.

Referring now to FIG. 4, a block diagram of a neural network 400 is illustrated, in accordance with an embodiment. The neural network 400 may include a hidden layer 402, a SoftMax classifier layer 404, a RNN layer 406, and an output layer 408. An input vector 410 may be inputted to the hidden layer 402. As shown in FIG. 4, the input vector 410 may include "0"s or "1"s representing the words. For example, in continuation with the above example, the "1" in the input vector 410 may represent the word "Trade". There may be no activation function on the hidden layer neurons 402, and the output neurons may use SoftMax classifier layer 404. For example, the neural network 400 may learn word vectors with 300 features. So, the hidden layer may be represented by a weight matrix with 5,000 rows (one for every word in the vocabulary) and 300 columns (one for every hidden neuron). The number of features may be a "model parameter" that the neural network 400 may have to tune to the output. Specifically, each output neuron may have a weight vector which it may multiply against the word vector from the hidden layer 402. Thereafter, a function exp(x) may be applied to the result. Finally, in order to get the outputs to sum up to 1, this result may be divided by the sum of the results from all 5,000 output nodes.

It may be noted that using the knowledge from an external embedding, the precision of the RNN model may be enhanced by integrating new information (lexical and semantic) about the words. This information may have been trained and distilled on a very large corpus of data. For example, the pre-trained embedding may be Word vector. The logic behind the RNN model may be to consider the sequence of the input. For predicting the script name for the scenario, the neural network may need to remember what word appeared in the previous time step. It may be understood that these neural networks are called Recurrent Neural Networks (RNN) because this step is performed for every input. As the neural network considers the previous word during predicting, it acts like a memory storage unit which stores it for a short period of time. The RNN model may be a sequence of neural network blocks that may be linked to each other like a chain. Each of these neural network blocks may be passing a message to a successor. A sequence type scenario data is processed. The scenarios may be tokenized and converted from text strings to sequences of numbers. These numbers represent the position of each word in the dictionary.

Figure 5:
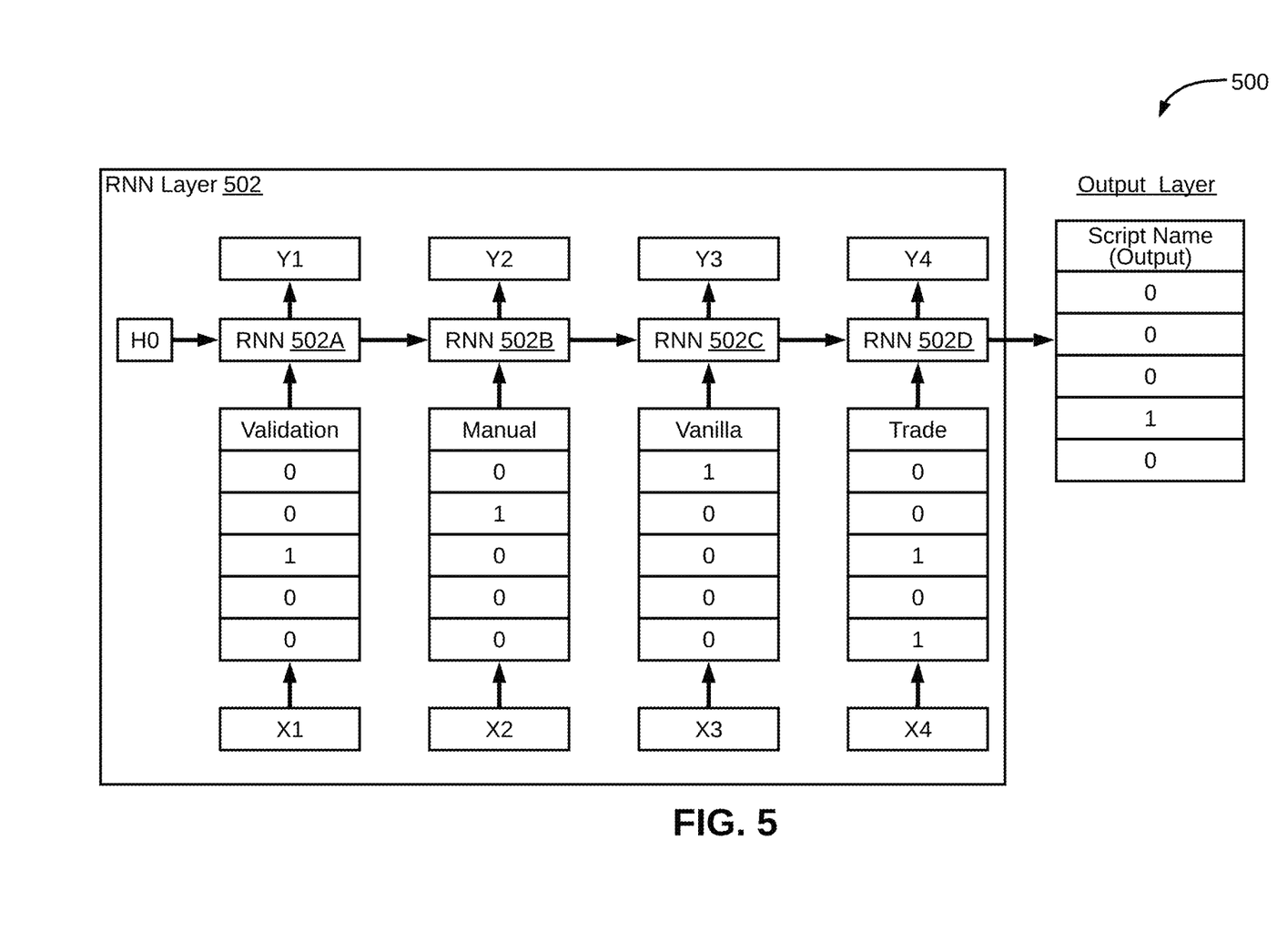
FIG. 5 is a block diagram of an RNN layer of a neural network, in accordance with another embodiment.

Referring now to FIG. 5, an RNN layer 502 of a RNN model (neural network) 500 is illustrated in accordance with another embodiment. The RNN layer 502 may further include layers 502A, 502B, 502C, and 502D. It may be noted that according to the technique of RNN, a first word (validation) may be fed into a first neural network layer 502A which may predict an output (y1). This process may be repeated until the last word (e.g. "Trades") may generate the last output (y4). One or more parameters may be updated between each input and hidden layer for every timestamp and between the hidden layer and the output. When a prediction is made from Y4, it may internally have information about the Y1, Y2, and Y3. The output Y1 may be the probability of any word in the corpus. The second output may be the probability of the predicted word given the first input word, and similarly, for all other words from voice turned text. The network may be trained with backpropagation.

Once all the time steps are completed, the final current state may be used to calculate the output. The output may then be compared to the actual output i.e. the target output and an error may be generated. The error may then be back-propagated to the network to update the weights, and hence train the network (RNN). A mechanism for confidence level Y(t) determination is described below. First, H(t) as a function "f" of H(t−1) and X(t) may be as given below:

$$H(t)=f(H(t-1),X(t));$$

where, H(t) represents current state of neurons, H(t−1) represents previous state of neurons and X(t) represents input state, t represents timestamp, and (t−1) represents previous timestamp.

Further, the function "f" may be "tanh" function. Thus H(t) may be as given below:

$$H(t) = \tanh(W_{hh} * H(t-1) + W_{xh} * X(t)); \text{ and}$$

where, $W_{hh}$ represents weight at recurrent neuron, and $W_{xh}$ represents weight at input neuron. Further, Y(t) may be as given below:

$$Y(t) = W_{hy} * H(t);$$

where, Y(t) represents output and $W_{hy}$ represents weight at output layer

In some embodiments, the hidden state vector may be multiplied element-wise by the hidden state weights. Similarly, element wise multiplication of the current input vector and the current input weights may be performed. This may generate the parameterized hidden state vector and current input vector. A vector addition of the two parameterized vectors may be performed and element-wise hyperbolic tangent may be calculated to generate the new hidden state vector. During the training of the recurrent network, the network may generate an output at each time step. This output may be used to train the network using gradient descent. Further, during the training of the recurrent network, the network may also generate an output at each time step. This output may be used to train the network using gradient descent. The back-propagation error involved may be of the same kind as the one used in a typical Artificial Neural Network (ANN) with some minor changes. An error (E) at each timestamp (t) may be calculated as per Stochastic differential equation as given below:

$$E_t = -yt \log(\overline{yt})$$

where, yt=predicted output, and $\overline{yt}$=actual output

The total error may be the summation of the errors at each timestamp, as given below:

$$E = \sum_t E_t$$

The back-propagation error through time may differ from a typical back-propagation error in that the errors at each timestamp are summed up to calculate the total error. The lesser the total back propagation error, more may be the confidence level.

Returning back to FIG. 3, at step 310, a defect slippage rate may be predicted based on the linear regression model. The defect slippage prediction module 206 may receive test scripts with confidence level (probability level) greater than the predetermined threshold confidence score. The defect slippage rate of the identified test scripts may be determined through the linear regression model with input features such as complexity, Lines of Code (LOC) and number of dependent modules. More features can be added based on data availability. Further, for every defect slippage rate lower than the predetermined threshold defect slippage rate, top probabilities from the RNN model and the related cases/scripts may be selected for testing for better coverage.

At step 312, a set of test cases/scripts may be selected based on the predicted defect slippage rate. This set of test cases/scripts may later be executed. At step 314, a status of executed appropriate set of test scripts/cases may be generated and updated. The test execution status may be either "successful" or "unsuccessful" based on the comparison of output of the test execution with the predetermined output. After execution of the test cases, the test execution status may be displayed to the user via a user interface.

At step 316, the RNN model parameters may be validated and auto-tuned based on actual defect slippage rate. The validating and auto-tuning of the model parameters may be performed by calculating the actual defect slippage rate from the production defects (post execution) of the selected set of test scripts. This results in continuous improvement of accuracy in the RNN module. Further, the production defects (post execution) i.e. the actual defect slippage rate may be compared with the predicted defect slippage rate. If the actual defect slippage rate is less than or equal to the predicted defect slippage rate (via the linear regression model), the determined automation scope is set to be "appropriate" which leads to defect slippage rate reduction. If the actual defect slippage rate from production defects (post execution) is greater than predicted defect slippage rate, the automation scope determination is "not appropriate", and the RNN model parameters would be auto-tuned to reach the maximum accuracy, and the updated RNN module may be used for script selection.

Figure 6:
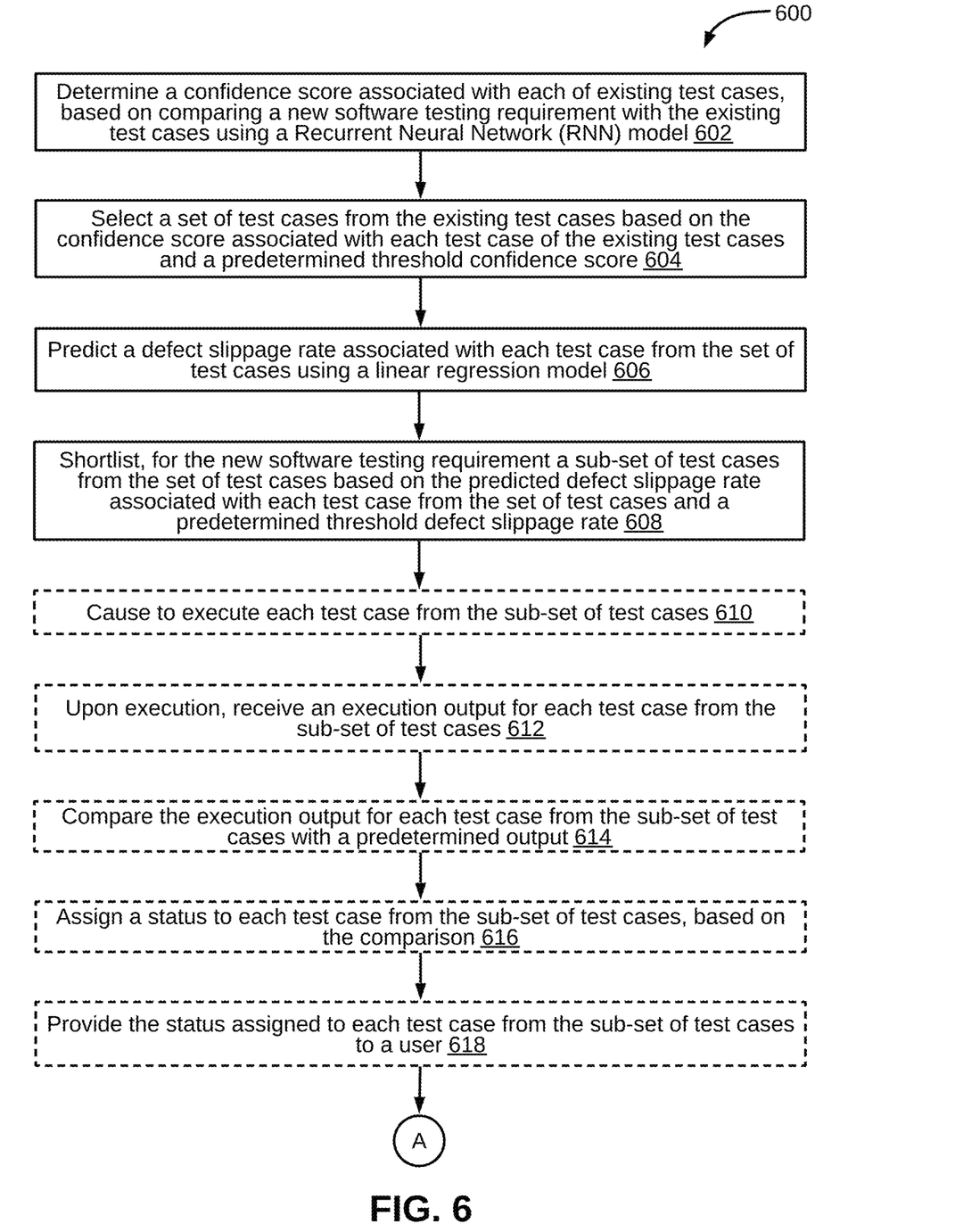
FIG. 6 is a flowchart of a detailed process for selecting test cases from existing test cases for a new software testing requirement, in accordance with an embodiment.

Referring now to FIG. 6, a flowchart of a process 600 for selecting test cases from existing test cases for a new software testing requirement is illustrated in greater detail, in accordance with an embodiment of the present disclosure. In some embodiments, an attempt may be made to identify a relevant test case from the existing test cases for the new software testing requirement by comparing the new software testing requirement with the existing test cases using a Jaccard index. If the attempt is unsuccessful, then at step 602, a confidence score associated with each of the existing test cases may be determined. The confidence score may be determined based on comparing a new software testing requirement with the existing test cases using the RNN model. It may be noted that in order to determine the confidence score, the new software testing requirement may be converted into a vector, and fed the vector into the RNN model. The confidence score may be representative of an extent of relevance of an associated test case from the existing test cases with the new software testing requirement.

At step 604, a set of test cases may be selected from the existing test cases based on the confidence score associated with each test case of the existing test cases and a predetermined threshold confidence score. At step 606, a defect slippage rate associated with each test case from the set of test cases may be predicted using a linear regression model. The defect slippage rate may be representative of a likelihood of occurrence of defects during execution of the associated test case. It may be noted that the linear regression model may be based on at least one of input features comprising a complexity, lines of code (LOC), or a number of dependent modules. At step 608, a sub-set of test cases may be shortlisted from the set of test cases based on the predicted defect slippage rate associated with each test case (from the set of test cases) and a predetermined threshold defect slippage rate.

Additionally, in some embodiments, at step 610, each test case from the sub-set of test cases may be executed. At step 612, upon execution, an execution output for each test case from the sub-set of test cases may be received. At step 614, the execution output for each test case from the sub-set of test cases may be compared with a predetermined output, and at step 616, a status may be assigned to each of these test cases, based on the comparison. At step 618, the status assigned to each of these test cases may be provided to a user, for example, via a display screen.

At step 620, upon execution, one or more defects associated with each test case from the sub-set of test cases may be received. At step 622, an actual defect slippage rate associated with each of these test cases may be determined, based on the one or more defects. At step 624, the predicted defect slippage rate may be compared with the actual defect slippage rate associated with each test case from the sub-set of test cases. At step 626, one or more parameters of the RNN may be tuned based on the comparison, to obtain an updated RNN model.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
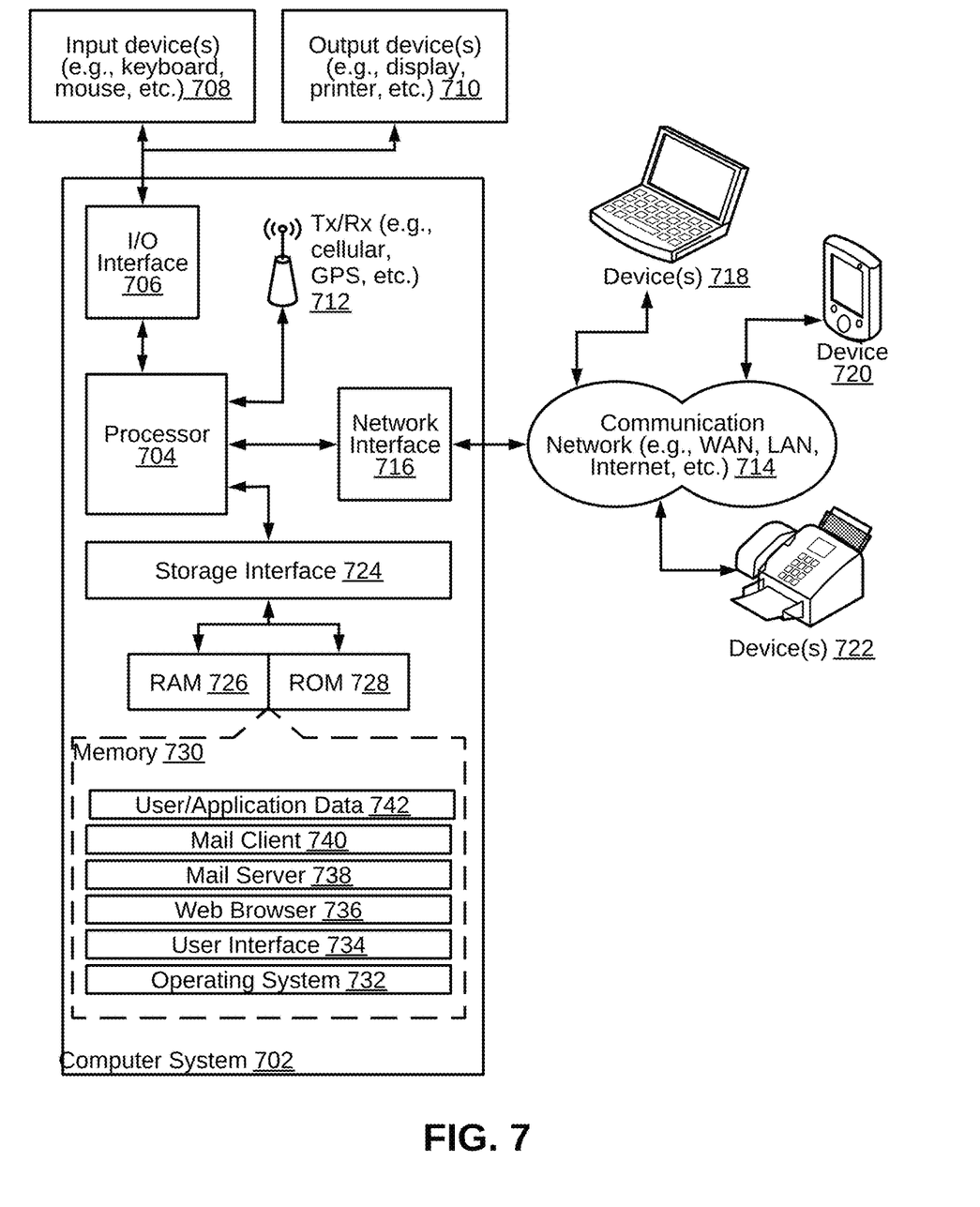
FIG. 7 is a block diagram of an exemplary computer system for implementing various embodiments.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user-generated or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices 718, 720, and 722 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices 718, 720, and 722.

In some embodiments, processor 704 may be disposed in communication with one or more memory devices 730 (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or data repository components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces 734 may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques described in the various embodiments discussed above provide for appropriate test case identification in automation testing. The techniques include assessing feasibility of new testing requirements using Jaccard Index-based determination of testing requirements as new testing requirements, and further checking feasibility of the new testing requirements. The techniques further include determining scope of testing based on RNN based confidence level for the new test requirements, and assessing suitability of existing test cases for the new requirements. Furthermore, the techniques include continuous accuracy assessment of test cases for new test requirement based on linear regression-based defect slippage rate determination, and auto-tuning of the RNN model parameters based on defect-slippage rate.

As will be appreciated by those skilled in the art, the above techniques provide for appropriate test case identification for automation testing with adequate coverage for new features, which will have the ability to improve accuracy over time. As a result, the techniques lead to faster and adequate product testing. This further leads to project cost optimization. The product defect slippage percentage continuously keeps reducing as appropriate test scripts are selected over time which provides for better test coverage, and as a result leading to a quality product. Moreover, by way of automated testing, human errors are eliminated.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of selecting test cases from existing test cases for a new software testing requirement, the method comprising:
   determining, by a test case selecting device, a confidence score associated with each of existing test cases, based on comparing a new software testing requirement with the existing test cases using a Recurrent Neural Network (RNN) model, wherein the confidence score is representative of an extent of relevance of an associated test case from the existing test cases with the new software testing requirement, wherein prior to determining the confidence score associated with each of the existing test cases, the method further comprises:
      attempting to identify a relevant test case from the existing test cases for the new software testing requirement by comparing the new software testing requirement with the existing test cases using a Jaccard index; and
      upon an unsuccessful attempt, determining the confidence score associated with each of the existing test cases based on comparing the new software testing requirement with the existing test cases using the RNN model;
   selecting, by the test case selecting device, a set of test cases from the existing test cases based on the confidence score associated with each test case of the existing test cases and a predetermined threshold confidence score;
   predicting, by the test case selecting device, a defect slippage rate associated with each test case from the set of test cases using a linear regression model, wherein the defect slippage rate is representative of a probability of occurrence of defects during execution of the associated test case;
   shortlisting for the new software testing requirement, by the test case selecting device, a sub-set of test cases from the set of test cases based on the predicted defect slippage rate associated with each test case from the set of test cases and a predetermined threshold defect slippage rate; and
   causing to execute each test case from the sub-set of test cases.

2. The method of claim 1 further comprising:
   upon execution, receiving an execution output for each test case from the sub-set of test cases;
   comparing the execution output for each test case from the sub-set of test cases with a predetermined output;
   assigning a status to each test case from the sub-set of test cases, based on the comparison; and
   providing the status assigned to each test case from the sub-set of test cases to a user.

3. The method of claim 1 further comprising:
   causing to execute each test case from the sub-set of test cases;
   upon execution, receiving one or more defects associated with each test case from the sub-set of test cases; and
   determining an actual defect slippage rate associated with each test case from the sub-set of test cases, based on the one or more defects.

4. The method of claim 3 further comprising:
   comparing the predicted defect slippage rate with the actual defect slippage rate associated with each test case from the sub-set of test cases; and
   tuning one or more parameters of the RNN based on the comparison, to obtain an updated RNN model.

5. The method of claim 1, wherein the linear regression model is based on at least one of input features comprising a complexity, lines of code (LOC), or a number of dependent modules.

6. The method of claim 1, wherein determining the confidence score comprises converting the new software testing requirement into a vector, and feeding the vector into the RNN model.

7. A test case selecting device for selecting test cases from existing test cases for a new software testing requirement, the test case selecting device comprising:
   a processor; and
   a memory communicatively coupled to the processor, wherein the memory stores processor instructions, which, on execution, causes the processor to:
      determine a confidence score associated with each of existing test cases, based on comparing a new software testing requirement with the existing test cases using a Recurrent Neural Network (RNN) model, wherein the confidence score is representative of an extent of relevance of an associated test case from the existing test cases with the new software testing requirement, wherein prior to determining the confidence score associated with each of the existing test cases, the processor instructions further cause the processor to:
         attempt to identify a relevant test case from the existing test cases for the new software testing requirement by comparing the new software testing requirement with the existing test cases using a Jaccard index; and
         upon an unsuccessful attempt, determine the confidence score associated with each of the existing test cases based on comparing the new software testing requirement with the existing test cases using the RNN model;
      select a set of test cases from the existing test cases based on the confidence score associated with each test case of the existing test cases and a predetermined threshold confidence score;
      predict a defect slippage rate associated with each test case from the set of test cases using a linear regression model, wherein the defect slippage rate is representative of a probability of occurrence of defects during execution of the associated test case;
      shortlist, for the new software testing requirement, a sub-set of test cases from the set of test cases based on the predicted defect slippage rate associated with each test case from the set of test cases and a predetermined threshold defect slippage rate; and
      execute each test case from the sub-set of test cases.

8. The test case selecting device of claim 7, wherein the processor instructions further cause the processor to:
   upon execution, receive an execution output for each test case from the sub-set of test cases;
   compare the execution output for each test case from the sub-set of test cases with a predetermined output;

assign a status to each test case from the sub-set of test cases, based on the comparison; and provide the status assigned to each test case from the sub-set of test cases to a user.

9. The test case selecting device of claim 7, wherein the processor instructions further cause the processor to:

execute each test case from the sub-set of test cases;

upon execution, receive one or more defects associated with each test case from the sub-set of test cases; and determine an actual defect slippage rate associated with each test case from the sub-set of test cases, based on the one or more defects.

10. The test case selecting device of claim 9, wherein the processor instructions further cause the processor to:

compare the predicted defect slippage rate with the actual defect slippage rate associated with each test case from the sub-set of test cases; and tune one or more parameters of the RNN based on the comparison, to obtain an updated RNN model.

11. The test case selecting device of claim 7, wherein the linear regression model is based on at least one of input features comprising a complexity, lines of code (LOC), or a number of dependent modules.

12. The test case selecting device of claim 7, wherein determining the confidence score comprises converting the new software testing requirement into a vector, and feeding the vector into the RNN model.

13. A non-transitory computer-readable storage medium having stored thereon, a set of computer-executable instructions causing a computer comprising one or more processors to perform steps comprising:

determining a confidence score associated with each of existing test cases, based on comparing a new software testing requirement with the existing test cases using a Recurrent Neural Network (RNN) model, wherein the confidence score is representative of an extent of relevance of an associated test case from the existing test cases with the new software testing requirement, wherein prior to determining the confidence score associated with each of the existing test cases, the set of computer-executable instructions causes the computer to perform further steps comprising:

attempting to identify a relevant test case from the existing test cases for the new software testing requirement by comparing the new software testing requirement with the existing test cases using a Jaccard index; and upon an unsuccessful attempt, determining the confidence score associated with each of the existing test cases based on comparing the new software testing requirement with the existing test cases using the RNN model;

selecting a set of test cases from the existing test cases based on the confidence score associated with each test case of the existing test cases and a predetermined threshold confidence score;

predicting a defect slippage rate associated with each test case from the set of test cases using a linear regression model, wherein the defect slippage rate is representative of a probability of occurrence of defects during execution of the associated test case;

shortlisting, for the new software testing requirement, a sub-set of test cases from the set of test cases based on the predicted defect slippage rate associated with each test case from the set of test cases and a predetermined threshold defect slippage rate; and causing to execute each test case from the sub-set of test cases.

14. The non-transitory computer-readable storage medium of claim 13, wherein the set of computer-executable instructions causes the computer to perform further steps comprising:

upon execution, receiving an execution output for each test case from the sub-set of test cases;

comparing the execution output for each test case from the sub-set of test cases with a predetermined output;

assigning a status to each test case from the sub-set of test cases, based on the comparison; and providing the status assigned to each test case from the sub-set of test cases to a user.

15. The non-transitory computer-readable storage medium of claim 13, wherein the set of computer-executable instructions causes the computer to perform further steps comprising:

causing to execute each test case from the sub-set of test cases;

upon execution, receiving one or more defects associated with each test case from the sub-set of test cases; and determining an actual defect slippage rate associated with each test case from the sub-set of test cases, based on the one or more defects.

16. The non-transitory computer-readable storage medium of claim 15, wherein the set of computer-executable instructions causes the computer to perform further steps comprising:

comparing the predicted defect slippage rate with the actual defect slippage rate associated with each test case from the sub-set of test cases; and tuning one or more parameters of the RNN based on the comparison, to obtain an updated RNN model.

17. The non-transitory computer-readable storage medium of claim 13, wherein the linear regression model is based on at least one of input features comprising a complexity, lines of code (LOC), or a number of dependent modules, and wherein determining the confidence score comprises converting the new software testing requirement into a vector, and feeding the vector into the RNN model.

* * * * *